Aug. 25, 1964     J. W. KAPPEN     3,146,013
BUMPER UNIT
Filed Aug. 15, 1960
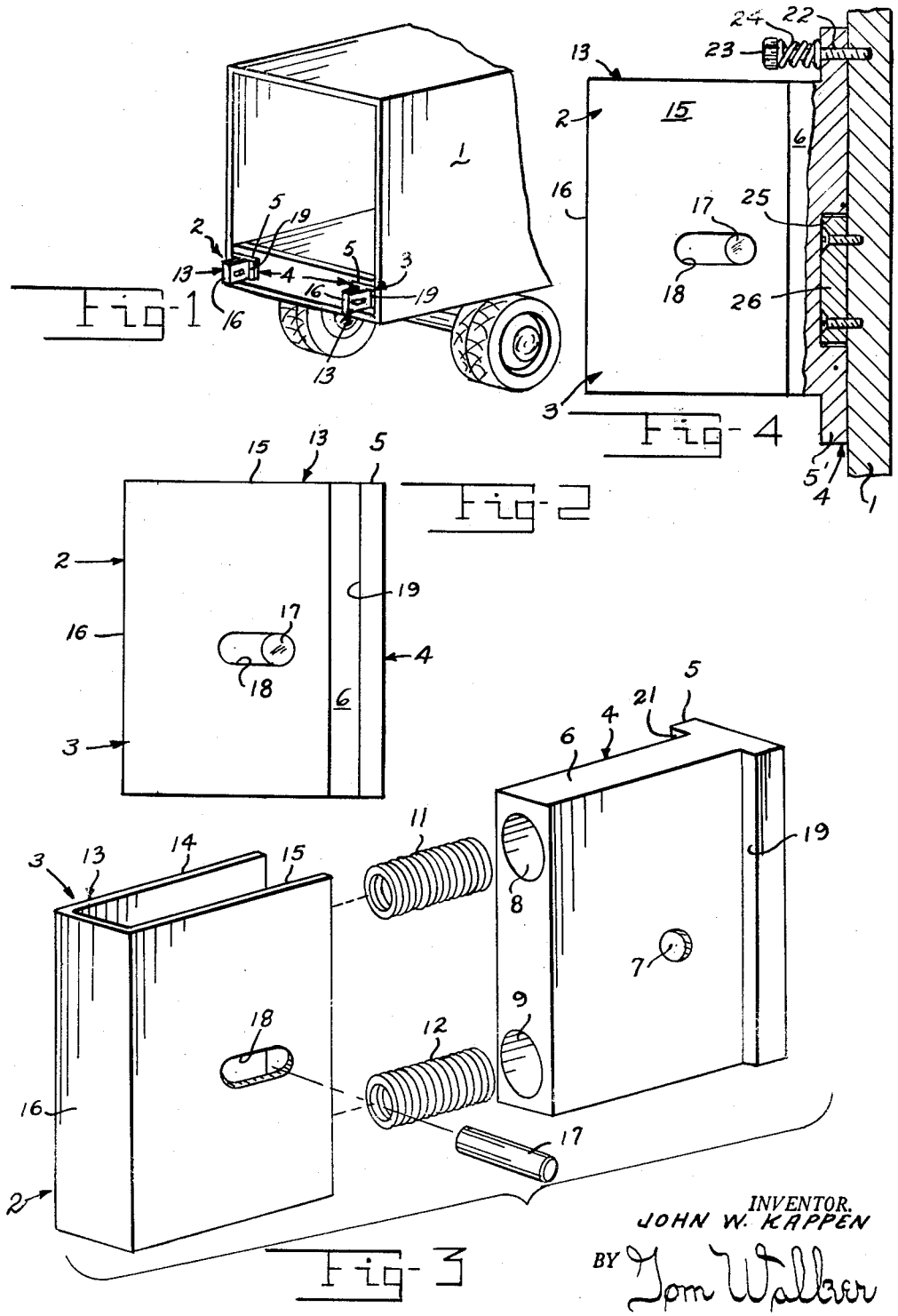
INVENTOR.
JOHN W. KAPPEN
BY Tom Walker
ATTORNEY 3,146,013
BUMPER UNIT
John W. Kappen, 243 Kenwood Ave., Dayton, Ohio;
Frieda E. Kappen, administratrix of said John W. Kappen, deceased
Filed Aug. 15, 1960, Ser. No. 49,739
2 Claims. (Cl. 293—64)

This invention relates to bumper units, and particularly to bumpers of the shock absorbing type adapted to be mounted on the rear of a truck or the like for damage free contact with a loading platform or dock.

The object of the invention is to simplify the construction as well as the means and mode of operation of bumpers, whereby such bumpers may not only be economically manufactured, but will be more efficient and satisfactory in use, adaptable to a wide variety of applications, and be unlikely to get out of order.

A further object of the invention is to present a bumper unit of integrated character which may be installed on the rear of a truck or the like to absorb without damage the shock of conatct of the truck with a loading platform or dock.

Another object of the invention is to present a bumper unit of the kind described which is self-adjusting to make a solid, continuous, contact with the platform irrespective of a lack of exact parallelism between the rear of the truck and the loading platform wall.

A further object of the invention is to present a bumper unit characterized by a relatively few number of parts and which includes a connection between inter-fitting body and contact members constructed and arranged to provide for relative pivotal motion of such members as well as to limit relative sliding motion therebetween in at least one direction.

A further object of the invention is to provide a bumper possessing the advantageous structural features, the inherent meritorious characteristics and the mode of operation herein mentioned.

With the above and ohter incidental objects in view as will more fully appear in the specification, the invention intended to be protected by Leters Patent consists of the features of construction, the parts and combinations thereof, and the mode of operation as hereinnafter described or illustrated in the accompanying drawings, or their equivalents.

Referring to the accompanying drawing wherein is shown one but obviously not necessarily the only form of embodiment of the invention, FIG. 1 is a fragmentary view of a truck equipped with bumper units in accordance with the illustrated embodiment of the invention;

FIG. 2 is a view of a bumper unit as shown in FIG. 1, in side elevation;

FIG. 3 is a view in exploded isometric of a bumper unit as shown in FIGS. 1 and 2; and FIG. 4 is a side elevation, partly in section, of a modified mounting for the bumper unit.

Like parts are indicated by similar characters of reference throughout the several views.

Referring to the drawing, a bumper unit in accordance with the illustrated embodiment of the invention is adapted for use, ordinarily in pairs, on the rear of a truck or trailer 1, as shown in FIG. 1. Thus, on opposite side edges of the rear of a truck, at vertical positions thereon determined by standard loading dock heights, are shock absorbing bumper units 2 and 3. Projecting rearwardly of the truck, the bumper units are adapted to engage the loading platform or dock as the truck is backed into position for loading or unloading. Tending to yield under the shock of engagement with the loading dock, in a manner which will hereinafter more clearly appear, the bumper units effectively avoid and obviate the kind of contact of the truck with the loading dock which heretofore frequently resulted in damage to either or both thereof.

Each unit 2 and 3 comprises a body 4 having a relatively wide base 5 adapted to be welded or otherwise secured to the truck. Projecting from the base 5, and outwardly or rearwardly of the truck in the installed position of the unit, is a generally rectangular portion 6. At a location intermediate its edges the rectangular projecting portion 6 of the body 4 is formed with a transverse through opening 7. At the outer end of portion 6, in spaced relation to one another, are longitudinal bores 8 and 9, these being arranged to lie respectively adjacent to the longitudinal edges of the portion 6 on opposite sides of the transverse opening 7. The bores 8 and 9 act as recesses to receive the one ends of respective compression springs 11 and 12, and the bores are of such depth as to allow the other ends of the springs to project normally through and beyond the plane of the outer end of body portion 6.

Cooperating with the body 4, and with the springs 11 and 12 seated therein, is a contact member 13 which is U or channel shaped in such a manner as to present laterally spaced projecting arms 14 and 15 joined at their one ends by an integral web or closure 16. The opposite ends of the arms 14 and 15 define an opening adapted to receive the projecting portion 6 of the body. The contact member 13 is, in the assembly of the unit, inter-engaged with the body 4, by inter-fitting the parts with the arms 14 and 15 in embracing relation to the projecting portion 6 of the body and with the compression springs 11 and 12 in engagement with the closure 16. This relationship of the parts is maintained by a pin 17 which is passed transversely through the opening 7 in the body 4 and through aligned slots 18 (one shown), in the arms 14 and 15 of the contact member. The slots 18 are elongated in a longitudinal sense whereby to allow limited relative sliding motion of the contact member on the body.

Assembled as described, the body 4 and contact member 13 normally occupy a position as illustrated in FIGS. 1 and 2 wherein the springs 11 and 12 constrain the member 13 to occupy an outwardly disposed position as limited by the engagement of the pin 17 in the right hand or inner ends of the slots 18. At this time, moreover, the open end of the member 13, as defined by the outer extremities of the arms 14 and 15, is spaced from the base 5 of the body. The latter provides, by virtue of the reduced cross-sectional area of the projecting portion 6, laterally extending shoulders 19 and 21 upon which the extremities of arms 14 and 15 may rest in order positively to limit inward relative motion of the contact member. In its assembled position, therefore, the contact member 13 of the unit is arranged to move in a bodily sliding motion upon the body 4 or in a rocking motion about the pin 17 as a pivot, or in a compound motion involving components of both bodily sliding and pivotal rocking movements. Accordingly, in response to engagement of the bumper units with a loading dock the shock of such engagement is initially sustained and absorbed in the springs 11 and 12 as they yield to the applied thrust. A positive limitation of such relative motion of the contact member 13 is provided by the shoulders 19 of the body 4. The bumper units are self-adjusting under conditions of non-flush engagement of the surface 16 with the dock and respond with a tilting movement to a thrust not squarely applied. The bumper accordingly assumes an angular position as required by the conditions of engagement without alteration in the shock absorbing action performed. The springs 11 and 12, being located on opposite sides of the pivot pin 17, tend to hold the contact member 13 normally aligned with the body portion 6 and resist angular motion thereof.

In the drawings, the bumper units have been shown vertically disposed but it will be understood that they may also be mounted horizonally and in angular positions between vertical and horizontal. Also, the pin 17 may be used to limit inward motion of the member 13, as well as outward motion. The shoulders 19, however, since they are in effect an integral extension of the truck body itself, provides a more resistant impact absorbing means.

Shown in FIG. 4 is a modified mounting for the bumper unit of this application which permits easy and ready displacement of the bumper unit from its normal operating position on the rear of a vehicle should it become necessary due to peculiar circumstances to displace the bumper unit to an inoperative position where it will not interfere. The base member 5' is elongated in relation to the base 5 and is provided with an opening therethrough. A mounting stud 22 is passed through the opening in the base 5 and into the rear portion of the truck or trailer 1. Thus the base 5 and its bumper unit are suspended upon the stud 22 for relative swinging motion about the stud should such swinging motion become necessary. The bumper unit and its flange 5' are held in abutting relation to the trailer 1 by means of a compression spring 24 which surrounds the stud 22 and is located intermediate the base 5' and a tension control nut 23. By adjustment of the nut 23 on the stud 22 sufficient tension is provided in the spring 24 so as to hold the bumper unit and its base 5' in contacting abutting relation to the trailer 1.

To assist in maintaining the bumper unit in proper operating position a recess 25 is provided in the surface of the flange 5' adjacent the truck 1. Mounted on the truck 1 is a locating bar 26 which is so proportioned as to fit within the recess 25 of the base 5'. The bumper unit is thereby maintained in proper predetermined operating position by means of the bar 26 and stud 22. To move the bumper from operative position it is only necessary to retract the bumper unit against the yielding resistance of spring 24 a distance sufficient to clear the bar 26 from the base 5' whereupon the unit may be swung to any desired inoperative position.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A bumper unit, comprising a base support, a body member fixed to and projecting perpendicularly from said support, an outer face of said body member including longitudinally directed spaced bores oriented generally perpendicular to said base support, springs in said bores normally projecting from said body member beyond its outer face, a U-shaped channel contact member, said U-shaped channel contact member having arms and open ends, said arms of said U-shaped channel member disposed on opposite sides of said body member, a slot in each of said arms normally oriented perpendicular to said base support, means for pivotally mounting said U-shaped channel contact member to said body member constituting removable pin means mounted perpendicularly to said body member and projecting into each of said slots to mount said U-shaped channel member for rocking movement thereabout and for sliding movement thereon in a direction perpendicular to said base support.

2. A bumper unit as set forth in claim 1, characterized by said body member having a rectangular configuration and including an enlarged base support extending beyond said body member against which said contact member seats, said enlarged base support providing abutment means for the arm portions of said U-shaped channel contact member to limit the movement of said contact member.

References Cited in the file of this patent
UNITED STATES PATENTS

| | | |
|---|---|---|
| 458,532 | Green | Aug. 25, 1891 |
| 524,217 | Richards | Aug. 7, 1894 |
| 612,396 | Brown | Oct. 18, 1898 |
| 802,705 | Parker | Oct. 24, 1905 |
| 959,232 | Lane | May 24, 1910 |
| 1,043,316 | Hanna et al. | Nov. 5, 1912 |
| 1,696,089 | Huey | Dec. 18, 1928 |
| 2,128,656 | Long | Aug. 30, 1938 |
| 2,562,611 | Geer et al. | July 31, 1951 |
| 2,563,976 | Torosian | Aug. 14, 1951 |
| 2,593,586 | Magg | Apr. 22, 1952 |
| 2,695,763 | D'Azzo | Nov. 30, 1954 |
| 2,701,113 | Koonter | Feb. 1, 1955 |
| 2,715,037 | Magg | Aug. 9, 1955 |
| 2,965,403 | Barenyi et al. | Dec. 20, 1960 |